United States Patent
Young

(10) Patent No.: US 11,165,328 B2
(45) Date of Patent: Nov. 2, 2021

(54) HIGH EFFICIENCY, PARALLEL, POWER CONVERSION SYSTEM WITH ADAPTIVE DYNAMIC EFFICIENCY OPTIMIZATION

(71) Applicant: Agility, LLC, Atlanta, GA (US)

(72) Inventor: Jason Young, Brookhaven, GA (US)

(73) Assignee: Agility, LLC, Atlanta, GA (US)

( * ) Notice: Subject to any disclaimer, the term of this patent is extended or adjusted under 35 U.S.C. 154(b) by 0 days.

(21) Appl. No.: 16/669,267

(22) Filed: Oct. 30, 2019

(65) Prior Publication Data

US 2020/0136493 A1 Apr. 30, 2020

Related U.S. Application Data

(60) Provisional application No. 62/817,651, filed on Mar. 13, 2019, provisional application No. 62/752,893, filed on Oct. 30, 2018.

(51) Int. Cl.
*H02M 3/07* (2006.01)
*H02M 1/00* (2006.01)
(Continued)

(52) U.S. Cl.
CPC ............ *H02M 1/00* (2013.01); *H02M 3/07* (2013.01); *H02M 7/04* (2013.01); *H02M 7/44* (2013.01); *H02M 1/0048* (2021.05)

(58) Field of Classification Search
CPC ............ H02M 2001/0009; H02M 2001/0012; H02M 2001/0016; H02M 2001/0019; H02M 2001/0022; H02M 2001/0029; H02M 2001/0041; H02M 2001/0045; H02M 2001/0048; H02M 2001/0054; H02M 2001/0067–008; H02M 2001/0083; H02M 2001/009; H02M 1/00; H02M 1/0032; H02M 1/0035; H02M 1/0048; H02M 1/36; H02M 1/0095; H02M 1/0009; H02M 1/0012; H02M 1/0016; H02M 1/0019; H02M 1/0022; H02M 1/0029; H02M 1/0041; H02M 1/0045;
(Continued)

(56) References Cited

U.S. PATENT DOCUMENTS 7,412,612 B2 * 8/2008 Maple ................ H02M 3/1588
363/178
8,769,322 B2 * 7/2014 Lu ............................ G06F 1/08
713/300
(Continued)

FOREIGN PATENT DOCUMENTS

EP   3 240 171 A1   11/2017
KR   20160007234 A   1/2016

OTHER PUBLICATIONS

International Search Report and Written Opinion, PCT/US2019/058888, dated Feb. 7, 2020, 23 pages.

*Primary Examiner* — Thienvu V Tran
*Assistant Examiner* — Carlos O Rivera-Perez
(74) *Attorney, Agent, or Firm* — Nelson Mullins Riley & Scarborough LLP; Anthony A. Laurentano

(57) ABSTRACT

A system for controlling a plurality of power converters in a power system so as to turn each of the plurality of power converters into an ON state or an OFF state as a function of a sensed input power and a sensed output power such that one or more of the plurality of power converters in the ON state are operating in an optimal power efficiency range.

24 Claims, 8 Drawing Sheets

(51) Int. Cl.
*H02M 7/04* (2006.01)
*H02M 7/44* (2006.01)

(58) Field of Classification Search
CPC ..... H02M 1/0054; H02M 1/0067–008; H02M 1/0083; H02M 1/009; H02M 3/07; H02M 3/073; H02M 3/135; H02M 3/139; H02M 3/142; H02M 3/155; H02M 3/156; H02M 3/158; H02M 3/1584; H02M 3/1588; H02M 2003/072; H02M 2003/075–077; H02M 2003/1566; H02M 2003/1586; H02M 7/04; H02M 7/44; H02M 7/064; H02M 7/08; H02M 7/155; H02M 7/17; H02M 7/19; H02M 7/23; H02M 3/04; H02M 3/071; H02M 3/072; H02M 3/075–077; H02M 3/1566; H02M 3/1586; Y02B 70/10

USPC .... 363/15–21.03, 34, 36, 65–72, 89, 95–99, 363/123, 124, 125, 131–134; 323/212–219, 268, 271–275, 282–287, 323/299–303, 351

See application file for complete search history.

(56) References Cited

U.S. PATENT DOCUMENTS

| | | | |
|---|---|---|---|
| 2002/0131280 A1* | 9/2002 | Balakrishnan | H02M 1/36 363/21.15 |
| 2009/0327787 A1* | 12/2009 | Yu | G01R 19/2513 713/340 |
| 2011/0157934 A1* | 6/2011 | Clemo | H02J 1/102 363/71 |
| 2012/0039378 A1* | 2/2012 | Nakayama | H02M 3/337 375/226 |
| 2014/0365151 A1* | 12/2014 | Han | H02M 3/156 702/64 |
| 2015/0311792 A1 | 10/2015 | Amaro et al. | |
| 2016/0197552 A1* | 7/2016 | Giuliano | H02M 3/158 363/60 |
| 2018/0131280 A1* | 5/2018 | Wakabayashi | H03F 3/2176 |

* cited by examiner

HIGH EFFICIENCY, PARALLEL, POWER CONVERSION SYSTEM WITH ADAPTIVE DYNAMIC EFFICIENCY OPTIMIZATION

RELATED PATENT APPLICATIONS

The present application claims priority to U.S. provisional patent application Ser. No. 62/752,893, filed on Oct. 30, 2018, and claims priority to U.S. provisional patent application Ser. No. 62/817,651, filed on Mar. 13, 2019, and where the contents of the foregoing applications are incorporated herein by reference.

BACKGROUND OF THE INVENTION

The present invention is related to power conversion systems, and more particularly is related to power conversion systems that optimize the power usage of the system components.

Conventional power conversion systems are known and typically employ magnetic-type power converters for converting a power parameter, such as current or voltage, from a first level to a second level. Typical magnetic type power converters employ a transformer to convert the power between the first and second levels. As such, if the power is increased from the first level to the second level, then the power converter is called a step-up power converter. Likewise, if the power is decreased from the first level to the second level, then the power converter is called a step down power converter.

A drawback of using conventional magnetic type power converters is that they typically employ windings disposed about a core, and hence there are power losses associated therewith. Further, traditional magnetic transformers and inverters have an efficiency curve which typically peaks at around 50% of rated load and then starts to drop off as the load moves toward the maximum rated load. The traditional transformers also suffer similarly efficiency drops at low load. A primary cause of inefficiency at low load is power loss due to operating control circuitry and device drivers configured to switch high-capacitance gates of large switching transistors; and a primary cause of inefficiency at high load is resistive losses at high currents.

SUMMARY OF THE INVENTION

The present invention is directed to a power conversion system that employs a controller to control the operation of an array of power converters. The controller controls the power converter array by ensuring that a suitable number of power converters are operating in an optimal power efficiency range while concomitantly providing power to a load. The controller in combination with a selection unit optionally selects the specific frequency of operation for each of the power converters. The power conversion system can also include an optional comparison unit for comparing the measured instantaneous power provided by the system to a threshold level to determine if the system needs to by-pass the controller and instruct the power converters in the OFF state to discharge pre-stored power directly to the load.

The present invention is directed to a system for controlling a plurality of power converters in a power system comprising a plurality of power converters forming an array for converting power from a first power level to a second power level, where the power converters are coupled to a common input power line on an input side for providing input power at the first power level and a common output power line on an output side for providing power to a load at the second power level. The system also includes a controller coupled to the plurality of power converters for controlling a power output of the power converters, an input sensing circuit for sensing the input power on the common input power line and transmitting an input power signal to the controller, and an output sensing circuit for sensing the output power on the common output power line and transmitting an output power signal to the controller. The controller is configured to control each of the plurality of power converters so as to turn each of the plurality of power converters into an ON state or an OFF state as a function of the sensed input power and the sensed output power such that one or more of the plurality of power converters in the ON state are operating in an optimal power efficiency range.

According to the present invention, the power converters can include a switched capacitor type DC-DC step-down power converter for converting the power from the first power level to the second power level, where the second power level is lower than the first power level.

Alternatively, the power converters can include a DC-DC power converter, a DC-AC power converter, or a AC-DC power converter. According to another practice, each of the power converters can include a plurality of capacitors having stored power associated therewith. The capacitors can be optionally electrically connected in a parallel arrangement, a serial arrangement, a parallel-serial arrangement, or a series-parallel arrangement.

According to another aspect of the present invention, the controller can include a processor, a look up table, and a memory for storing instructions that when received by the processor instructs the processor to determine the power across one or more of the plurality of power converters, and based on the power of the one or more power converters, accessing the look up table and determining therefrom which of the plurality of power converters the controller places in the ON state and the OFF state.

According to another aspect, the controller can include a memory unit for storing instructions for controlling the plurality of power converters, a signal conditioner for conditioning the input power signal and the output power signal and generating a conditioned output power signal, an AC-DC converter for converting the conditioned output power signal to a DC conditioned output power signal, and a processor for processing the DC conditioned output power signal and for generating based on the stored instructions controller output signals for controlling one or more of the plurality of power converters so as to turn the plurality of power converters into the ON state and the OFF state. The conditioned output power signal can include a conditioned output voltage component and a conditioned output current component, and the processor includes a filter unit for averaging the conditioned output voltage component and the conditioned output current component of the conditioned output power signal, a power determination unit for determining the power across one or more of the plurality of power converters based on an average of the conditioned output voltage component and the conditioned output current component and generating a power determination output signal, a hysteresis unit for reducing noise in the power determination output signal, and a look-up table for storing information associated with a plurality of power levels across at least one of the plurality of power converters correlated to a plurality of power converters to be placed in the ON state or the OFF state. As such, the controller generates one or more output control signals for turning one or more of the plurality of power converters into the ON state and the OFF state based on the look-up table. The power levels across the controller correspond to the power requirements of the load.

The signal conditioner can include a voltage conditioning unit for buffering the input voltage component and the output voltage component to remove noise therefrom and to scale the input voltage component and the output voltage component to a selected voltage level for use by the controller, and a current conditioning unit for filtering the input current component and the output current component. The current conditioning unit can include a low pass filter for filtering the input and output current components.

According to still another aspect, the system can include a signal conditioner for conditioning the input power signal and the output power signal and generating a conditioned output power signal, a clock selection unit coupled to the controller and to the plurality of power converters for varying a frequency of one or more of the plurality of power converters, and a comparison unit coupled to the controller and to the selection unit. The controller generates a first output control signal, and the comparison unit receives the conditioned output power signal and the first output control signal, and in response generates an output comparison signal. Specifically, the comparison unit receives the conditioned output power signal and the first output control signal, and in response generates an output comparison signal when a value associated with the conditioned output power signal is greater than a value associated with the first output control signal.

Further, the output comparison signal is transmitted to the clock selection unit, which in turn transmits an output signal to the plurality of power converters, and in response to the output signal from the clock selection unit the stored power of the one or more capacitors of the power converters in the OFF state is transmitted to the common output power line. The clock selection unit comprises one or more clock generators for generating the frequency and a selector for selecting the frequency.

The present invention is also directed to a method of controlling a plurality of power converters in a power system, comprising providing a plurality of power converters forming an array for converting power from a first power level to a second power level, providing a controller coupled to the plurality of power converters for controlling a power output of the power converters, sensing with an input sensing circuit coupled to the controller and to an input power line input power on the input power line and transmitting an input power signal to the controller, and sensing with an output sensing circuit coupled to the controller and to an output power line output power on the output power line and transmitting an output power signal to the controller, and controlling each of the plurality of power converters so as to turn each of the plurality of power converters into an ON state or an OFF state as a function of the sensed input power and the sensed output power such that one or more of the plurality of power converters in the ON state are operating in an optimal power efficiency range.

The power converters preferably include a switched capacitor type DC-DC step-down power converter for converting the power from the first power level to the second power level, where the second power level is lower than the first power level.

According to another aspect, the method includes determining power across one or more of the plurality of power converters, and based on the power of the one or more power converters, accessing a look up table and determining therefrom which one of the plurality of power converters the controller places in the ON state and the OFF state.

The controller can include a memory unit for storing instructions for controlling the plurality of power converters, a signal conditioner for conditioning the input power signal and the output power signal and generating a conditioned output power signal, an AC-DC converter for converting the conditioned output power signal to a DC conditioned output power signal, and a processor for processing the DC conditioned output power signal and for generating based on the stored instructions controller output signals for controlling one or more of the plurality of power converters so as to turn the plurality of power converters into the ON state and the OFF state.

According to another aspect, the conditioned output power signal has a conditioned output voltage component and a conditioned output current component, and the processor comprises a filter unit for averaging the conditioned output voltage component and the conditioned output current component of the conditioned output power signal, a power determination unit for determining the power across one or more of the plurality of power converters based on an average of the conditioned output voltage component and the conditioned output current component and generating a power determination output signal, a hysteresis unit for reducing noise in the power determination output signal, and a look-up table for storing information associated with a plurality of power levels across at least one of the plurality of power converters correlated to a plurality of power converters to be placed in the ON state or the OFF state. The controller generates one or more output control signals for turning one or more of the plurality of power converters into the ON state and the OFF state based on the look-up table.

According to another aspect of the method of the invention, the system is adapted for conditioning the input power signal and the output power signal and generating a conditioned output power signal, varying a frequency of one or more of the plurality of power converters, and comparing a value associated with a control signal generated by the controller with a value associated with the conditioned output power signal, and when the value of the conditioned output signal is greater than the value of the control signal, generating a comparison signal. Further, in response to the comparison signal, transmitting stored power in one or more capacitors of the power converters in the OFF state to the output power line.

The controller generates a first output control signal, and the method further includes conditioning with a signal conditioner the input power signal and the output power signal and generating a conditioned output power signal, varying with a clock selection unit a frequency of one or more of the plurality of power converters, and comparing with a comparison unit the conditioned output power signal and the first output control signal, and in response generates an output comparison signal when a value associated with the conditioned output power signal is greater than a value associated with the first output control signal.

Still further, the method includes transmitting the output comparison signal to the clock selection unit, which in turn transmits an output signal to the plurality of power converters, and in response to the output signal from the clock selection unit, transmitting stored power of one or more capacitors associated with each of the plurality of power converters in the OFF state to the output power line. The clock selection unit includes one or more clock generators for generating the frequency and a selector for selecting the frequency.

BRIEF DESCRIPTION OF DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

As used herein, the term "power converter" is intended to include any type of converter capable of converting power or associated power components, including voltage and current, from one level to another. The power converters can include magnetic or inductive type converters and non-magnetic type converters, such as switched capacitor type power converters. Further, the power converters as contemplated herein can include DC-DC converters, DC-AC converters, and AC-DC converters, and can also include step up power converters and step-down power converters. Also, the DC-DC converters can include traditional inductor-based DC-DC converters, such as the buck or boost converters known in the art of DC-DC converters.

Switched capacitor type power converters are capable of reaching peak or near peak efficiency earlier in the load curve relative to magnetic type power converters and tend to maintain efficiency closer to peak ratings for longer periods in the load curve. However, the switched capacitor type power converters tend to drop in power efficiency before and after peak efficiency has been reached. That is, the switched capacitor type power converter efficiency can be close to peak efficiency across a wider range of operating points but still has a distinct efficiency curve with peak efficiency somewhere within the rated load range and decreased efficiency ratings as the load gets farther from the point at which peak efficiency is achieved. The present inventors have realized that there is an optimal efficiency and power range in which to operate the power converters.

As used herein, the term "power" can refer to a voltage, current or well-known electrical power that corresponds to an electrical current passing through a voltage potential (VI) and expressed in Watts.

Figure 1:
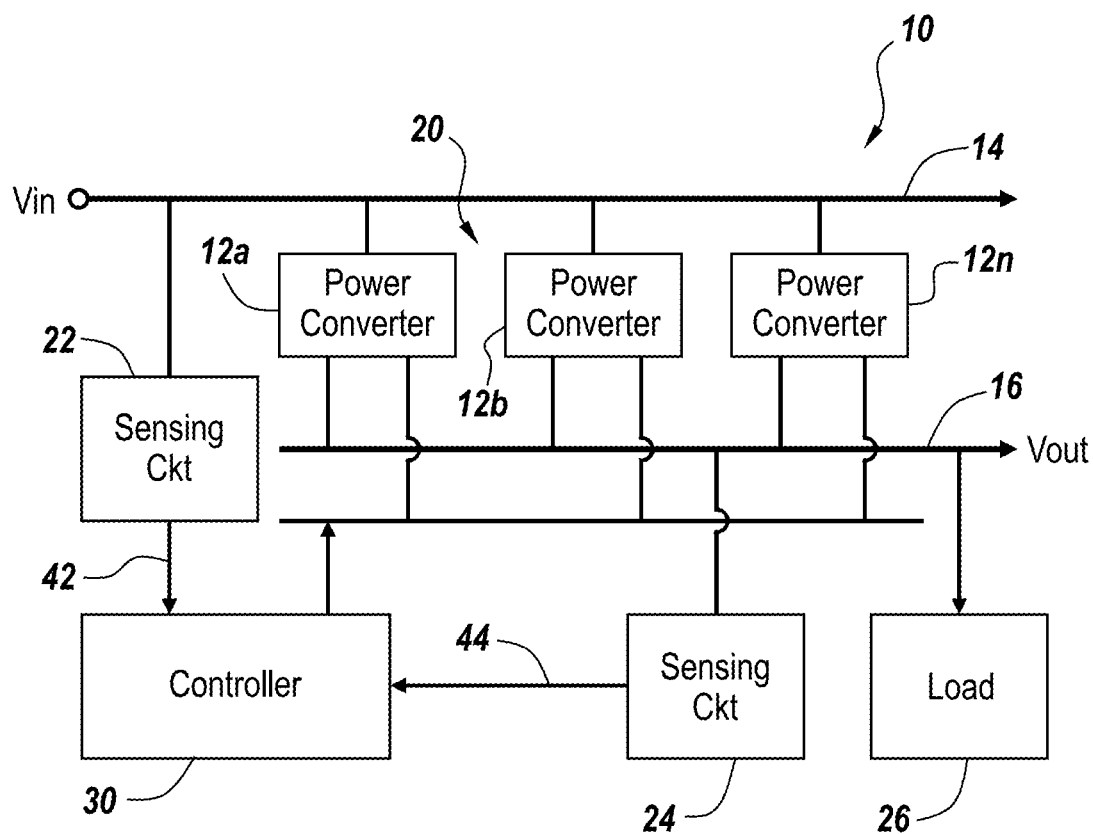
FIG. 1 is a schematic circuit diagram of a power conversion system for supplying power from an array of power converters to a load according to the teachings of the present invention.

The present invention is directed to a power conversion system 10, as illustrated in FIG. 1. The illustrated power conversion system 10 includes a plurality of power converters, and preferably a plurality of switched capacitor type power converters 12a, 12b, and 12n forming a power converter array 20 that are coupled to a common input power line 14 and to a common output power line 16. Those of ordinary skill in the art will readily recognize that any suitable number of power converters can form part of the power converter array 20 based on the overall power requirements of the system 10 and the load 26. The power converters 12a-12n are coupled to the common output power line 16 and arranged relative to each other in a parallel electrical configuration. An input sensing circuit 22 is coupled to the input power line 14 and an output sensing circuit 24 is coupled to the output power line 16. An external load 26 is coupled to the output power line 16. A controller 30 is coupled to the input sensing circuit 22 and to the output sensing circuit 24, as well as to the power converters 12a-12n.

The power converters are preferably step down power converters, although they could be step up power converters if desired. The power converters 12a, 12b, 12n are adapted to convert the first input voltage Vin provided on the input power line 14 to a second lower voltage Vout provided on the output power line 16. The input sensing circuit 22 senses the input voltage and current levels provided on the input power line 14 and provides these power measurements to the controller 30. Similarly, the output sensing circuit 24 senses the output current and voltage levels provided on the output power line 16 and also provides these power measurements to the controller 30. The input and output sensing circuits 22, 24 can thus include suitable and well known voltage and current sensors or detectors for measuring or sensing the voltage and current on the input and output power lines 14, 16 as is known in the art. The controller 30 processes the input voltage and current data from the sensing circuits 22, 24 to determine the instantaneous power of the system and provides control signals to the power converters 12a, 12b, 12n for controlling or regulating the power converters. The load 26 is coupled to the output power line 16 and corresponds to any load on the system 10. The load can be, for example, any type of resource, hardware or device that requires power for operation.

Figure 2:
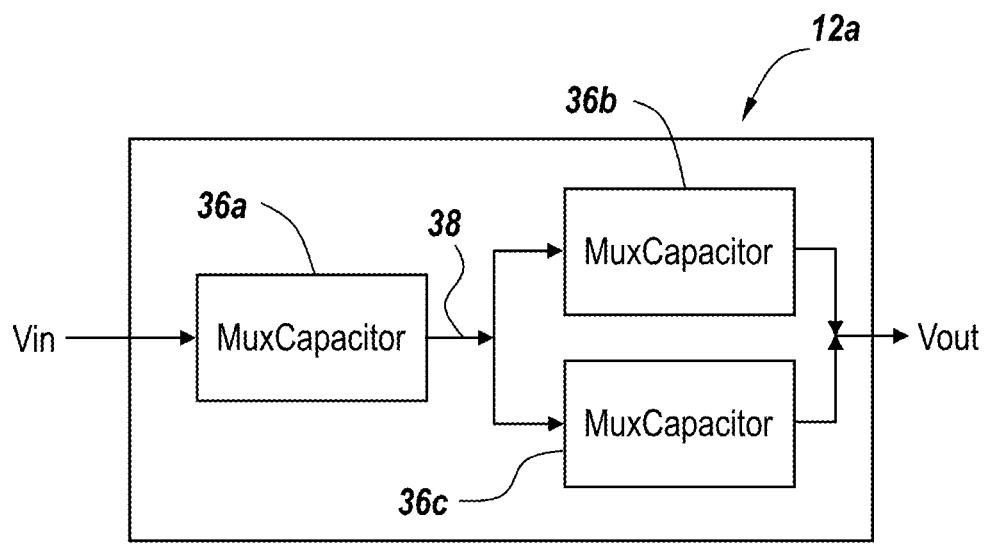
FIG. 2 is a schematic block diagram of the power converters of FIG. 1 according to the teachings of the present invention.

The illustrated power converters 12a, 12b, 12n can be any type of power converter, and preferably include a switched capacitor type power converter. Further, the power converters can be either DC-DC converters, DC-AC converters, or AC-DC converters, and are preferably DC-DC converters. An example type of switched capacitor type power converter suitable for use with the power conversion system 10 of the present invention includes the MxC200 DC-DC power converter manufactured by Helix Semiconductor, USA. FIG. 2 illustrates a simplified example of a suitable power converter for use as part of the power converter array 20. The illustrated power converter 12a can include selected power conversion circuitry (not shown) in addition to one or more capacitors. The capacitors can be incorporated into the power converter or can be associated with the power converter, such as a fly capacitor. According to one embodiment, the power converter can include a series of capacitors 36a, 36a, and 36c that can be arranged in any suitable electrical arrangement depending upon the level or magnitude of the step down voltage that the converters are designed to achieve. According to one practice, the capacitors can be capacitors associated with the MuxCapacitor topology of Helix Semiconductor. As such, the capacitors can be electrically connected in a parallel arrangement, a serial arrangement, a parallel-serial arrangement, or preferably a series-parallel arrangement, as shown. According to the current example, each of the muxcapacitors 36a, 36b, 36c can be designed to have a selected gain, such as a gain of 0.5, although they can be designed to have any selected gain characteristics. The muxcapacitors are included in the MxC200 power converters sold by Helix Semiconductor. In the illustrated example, the muxcapacitor 36a is coupled in series with the muxcapacitors 36b and 36c, which in turn are connected in parallel. Further to this example, if the input voltage is for example 48V, then the output of the muxcapacitor 36a is 24V at junction 38, and this voltage level is provided to the parallel connected muxcapacitors 36b and 36c. The muxcapacitors 36b, 36c further reduce the voltage from the intermediate voltage of 24V to an output voltage of 12V. Those of ordinary skill in the art will readily recognize that the power converters can be constructed in any selected manner and that FIG. 2 is provided for the sake of simplicity to illustrate the step down operational characteristic of the converters. Further, the capacitors and/or muxcapacitors can be connected in any suitable arrangement depending upon the desired output voltage. The common input power line 14 can supply the necessary operating power to the power converters. The muxcapacitors are configured to store power therein.

The illustrated power conversion system 10 can employ any suitable number of power converters depending upon the type of loads 26 that are to be powered. For example, there can be as many as a 1000 power converters in larger power conversion systems or as few as five in smaller power conversion systems. According to one practice, the present invention contemplates arranging a suitable array 20 of power converters to form a 1 kW or higher power system. Specifically, multiple power converters are connected in the power converter array 20 to generate 1000 W of power converted from 48 Vdc to 12 Vdc. Each of the illustrated power converters 12a, 12b, 12n in the array, for example, can be designed to reach peak efficiency at a selected power level, such as for example between around about 2.0 W-about 6.0 W of power, and have a maximum power capacity across each converter of around 15 W.

The illustrated controller 30 is intended to control the power converters 12a-12n in the power converter array 20 so as to enable or turn on the appropriate number of power converters based on the power needs of the load 26. The controller 30 is adapted and configured to control and turn ON or ENABLE the appropriate number of power converters while maintaining or achieving near peak power efficiency of the power converters in the power conversion system 10.

Figure 3:
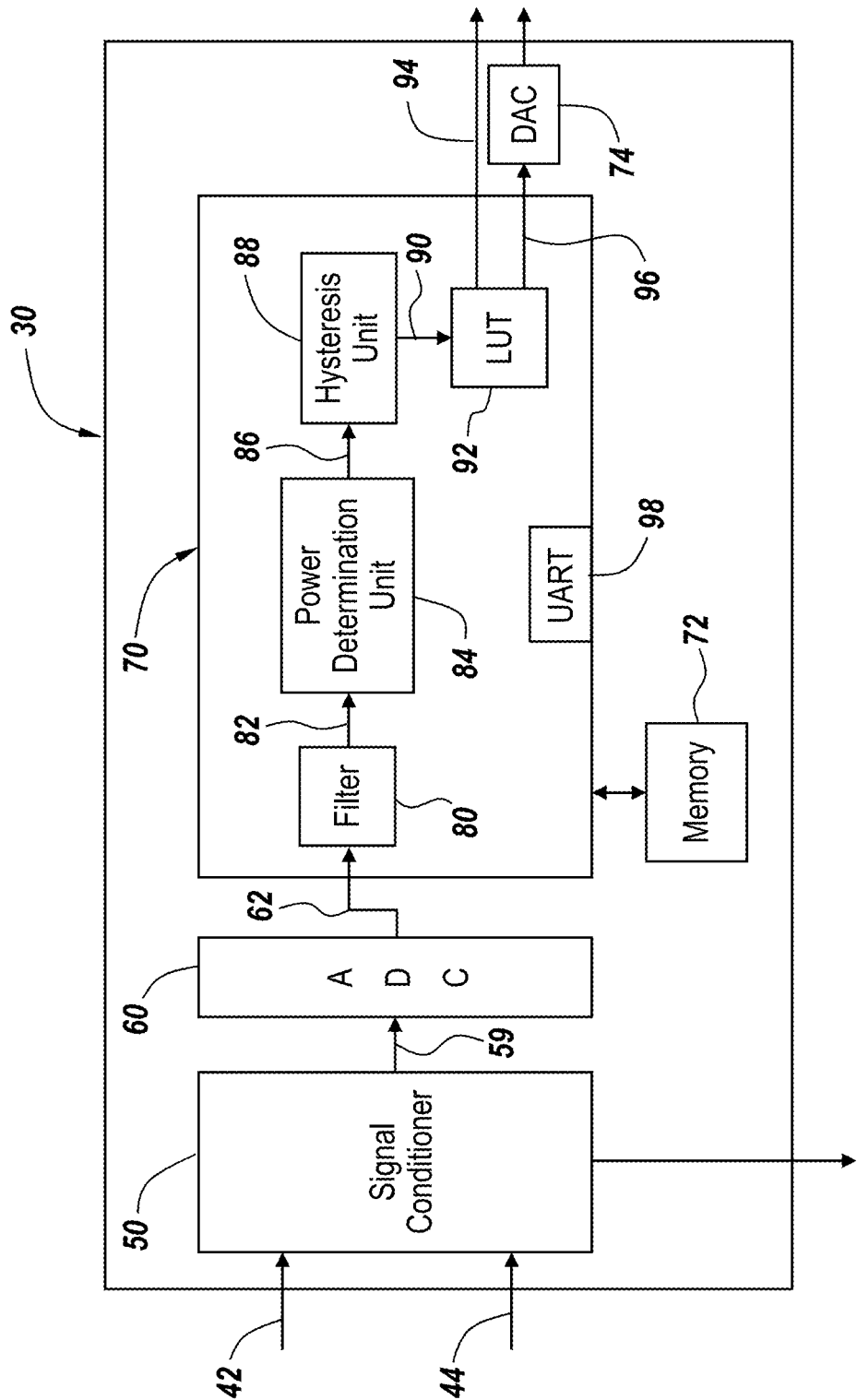
FIG. 3 is a schematic block diagram of the controller of FIG. 1 according to the teachings of the present invention.
Figure 4:
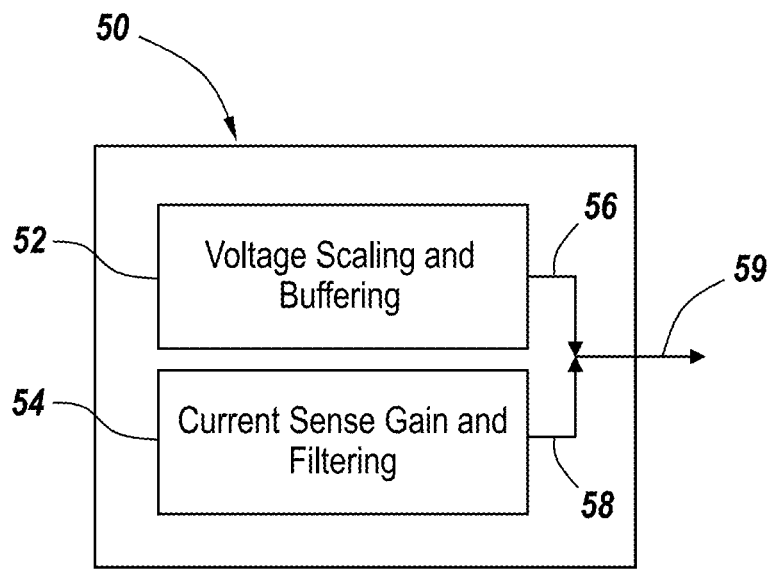
FIG. 4 is a schematic block diagram of the signal conditioner of FIG. 3 according to the teachings of the present invention.

FIGS. 3 and 4 depict the details of the controller 30 and related system components. The controller 30 includes a signal conditioning unit 50 for conditioning the input power signal 42 generated by the input sensing circuit 22 and the output power signal 44 generated by the output sensing circuit 24. The sensing circuits 22 and 24 sense the input and output voltage and current on the power lines 14 and 16, respectively, and then generate output power signals in response thereto. Specifically, the voltage component (e.g., the sensed voltage) of the power signals of the input and output power signals 42, 44 is conveyed to the voltage conditioning unit, which can include a voltage scaling and buffering unit 52, where the voltage is scaled and conditioned to remove any unwanted noise in the power signal and to scale the voltage to voltage levels suitable for use by the system components. The suitable voltage range can be in the range between about 0.0V and about 3.3V. Similarly, the current component (e.g., sensed current) of the power signals of the input and output power signals 42, 44 is conveyed to a current conditioning unit, such as the current sense gain and filtering unit 54, where the current is sensed and filtered so as to be suitable for use by the analog-digital (A-D) converter 60. The current sense gain and filtering unit 54 converts the input current signals using suitable current sense resistors, which output signals which in turn need to be amplified (i.e., gain) and filtered so as to be suitable for use by the A-D converter 60. The filtering portion of the current sense gain and filtering unit 54 employs a suitable filter, such as a low pass filter, to reduce the signal noise prior to being amplified. For example, the current sense gain and filtering unit 54 can employ a Butterworth low pass filter for filtering the current signals, although other types of filters can also be employed.

The controller 30 also includes the A-D converter 60 that receives the output power signal 59 from the signal conditioner 50, which includes the output signals 56, 58 from the voltage scaling and buffering unit 52 and the current sense gain and filtering unit 54, respectively, and converts these analog output signals into a digital output signal 62. The converted output signal 62 is introduced to a processor or processing unit 70. The processor 70 is configured to communicate with one or more memory units 72 and with a digital to analog (D-A) converter 74. The processor 70 can include any suitable logic circuitry that responds to and processes instructions retrieved from the memory unit 72. According to one practice, the processor 70 can be provided by a commercially available or custom designed microprocessor unit. The processor 70 may utilize instruction level parallelism, thread level parallelism, different levels of cache, and/or multi-core processors. The memory unit 72 is configured to store data and allow any storage location to be accessed by the processor 70. The memory unit 72 can store software, signal information, and other executable instructions for use by the processor 70. The memory 72 can be a single memory module or can be implemented as a series of memory modules that can be in the controller or located throughout the system 10 or as part of hardware or networks that communicate with the power conversion system 10. The memory 72 can be any suitable type of memory and can include volatile and/or non-volatile memory, examples of which include Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM), non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The memory unit 72 may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, "computer readable storage media" does not include communication media. Therefore, a computer storage or memory medium should not be interpreted to be a propagating signal per se or stated as transitory in nature. The propagated signals may be present in a computer storage media, but propagated signals per se are not examples of computer storage media, which is intended to be non-transitory. Although the memory unit 72 is shown within the controller 30, it will be appreciated that the memory unit may be distributed or located remotely and accessed via a network or other communication link. The processor 70 can communicate with the memory unit 72 via any suitable system bus.

Figure 13:
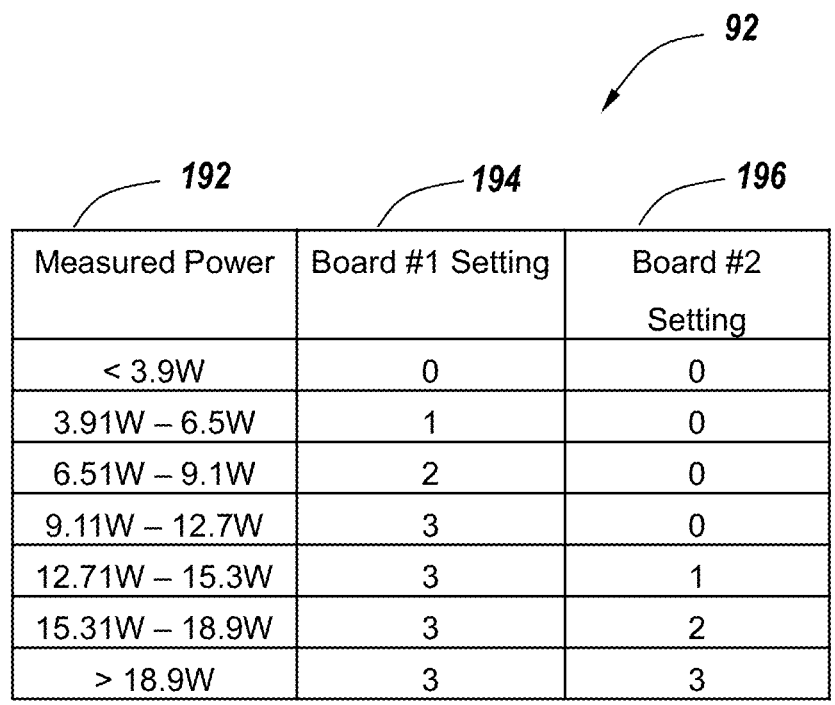
FIG. 13 is a sample look up table suitable for use with the power converter system of the present invention.

The illustrated processor 70 can include a filter unit 80 for averaging the power components (i.e., current and voltage) of the converted power signal 62 received from the A-D converter 60. The filtered output signal 82 is then conveyed to a power determination unit 84 that is configured to determine the power and if desired the power efficiency of one or more of the power converters or of the power conversion system 10 based on the voltage and current components of the power signals. The power determination unit 84 generates a power determination output signal 86 that is introduced to a hysteresis unit 88. The hysteresis unit 88 reduces chatter or noise on the output signal 90 that may adversely affect any clock signaling that occurs downstream in the system 10 by setting the switching or threshold level in a selected direction at a level different from the threshold level in the opposite direction. The hysteresis unit helps prevent the rapid turning on and off (e.g., chatter) of the power converters by the controller when the measured power levels are closely to or at the converter switching levels (e.g., 3.90 W in FIG. 13). The hysteresis unit 88 is applied after the power is calculated by the power determination unit 84, and the hysteresis unit does not transmit the output signal 90 to the look up table (LUT) 92 unless the calculated power changes by more than the hysteresis amount relative to a previous power calculation. The controller employs the LUT 92 in order to rapidly determine the proper power configuration of the power conversion system 10. Specifically, the look up table determines the appropriate number of power converters 12a-12n in the power converter array 20 that should be operating in order to meet the power demands of the load 26 while concomitantly operating the power converters 12a-12n within a selected optimal power efficiency range. The LUT 92 can be a multi-dimensional table that correlates different total power levels required by the load to a corresponding number of power converters that are operating. One example of a simplified version of a look up table 92 suitable for use with the present invention is shown in FIG. 13. The illustrated look up table 92, which is exemplary, is directed to a two-dimensional look up table for a power converter system having a total power rating of about 20 W. The 20 W power converter system can consist of six power converters 12a-12n mounted in any selected manner, such as for example across two separate circuit boards 194 and 196, where each circuit board 194, 196 includes three of the power converters. In the illustrated example table, the input variable is measured power 192, the outputs are control signals generated by the controller 30 that are sent to each circuit board that control how many power converters are turned ON and operating with a fast clock frequency, such as determined by the selection unit 110, FIGS. 6-7. The illustrated look up table 92 includes a series of measured power metrics spanning along the 20 W power range of the system. As illustrated, if the board setting is 0, then all of the power converters associated therewith are running with a slow clock frequency and hence are turned OFF or DISABLED, and if the setting is 1 then at least one of the power converters is turned ON and operating with the fast clock frequency, while concomitantly the other two power converters are on the slow clock frequency and are turned OFF. In the look up table 92, for power system levels less than 3.9 W, all six of the power converters are turned OFF and operating at the slow clock frequency rate. As the power increases, the power converters associated with the first circuit board are turned to the ON state one at a time. For example, for power levels between 3.91-6.5 W, then a first of the power converters is turned ON; a second power converter is turned on at power levels between 6.51-9.1 W; and a third power converter is turned ON at power levels between 9.11-12.7 W. During this time, all of the power converters associated with the second circuit board are turned OFF and operating at the slow clock frequency rate. For power levels above 12.71, in addition to the power converters of the first circuit board, the power converters associated with the second circuit board are turned ON one at a time as the power increases. The power converters are preferably switched ON and operated in their respective optimal power efficiency range prior to another one of the power converters being turned ON. That is, the controller 30 maintains the ON state of the power converters when operating in the optimal power efficiency range, and turns on additional power converters when the load requires additional power and the ON power converters would operate outside of the optimal power efficiency range. Those of ordinary skill in the art will readily recognize that the look up table 92 can have any suitable format or configuration based on the total power of the system, the number of power converters that are employed, as well as the number of circuit boards or blades are employed to electrically mount the power converters. The processor 70 can also include a universal asynchronous receiver-transmitter (UART) device 98 for receiving g instructions from a user according to any suitable communication methodology, such as through a serial interface (e.g., universal serial bus (USB)). One of ordinary skill in the art will readily recognize that the processor 70 can include or implement the functionality of any of the components of the illustrated controller 30 and that the configuration illustrated in FIG. 3 is merely one illustrative example of a suitable configuration.

The controller based on the information stored in the look up table (LUT) 92 generates a pair of output signals, such that the output signal 94 is transmitted to a selection unit 110 for adjusting a frequency, such as a clock rate frequency, of one or more of the power converters 12a-12n, and the output signal 96 is introduced to a digital to analog (D-A) converter 74 where the signal is converted from a digital signal to an analog signal, which is then transmitted to a comparison unit 120 for addressing load power situations that require a rapid response time. One of ordinary skill in the art will readily recognize that the controller can generate a single output signal rather than multiple output signals and can be generated in a series manner rather than in the indicated parallel manner.

Figure 5:
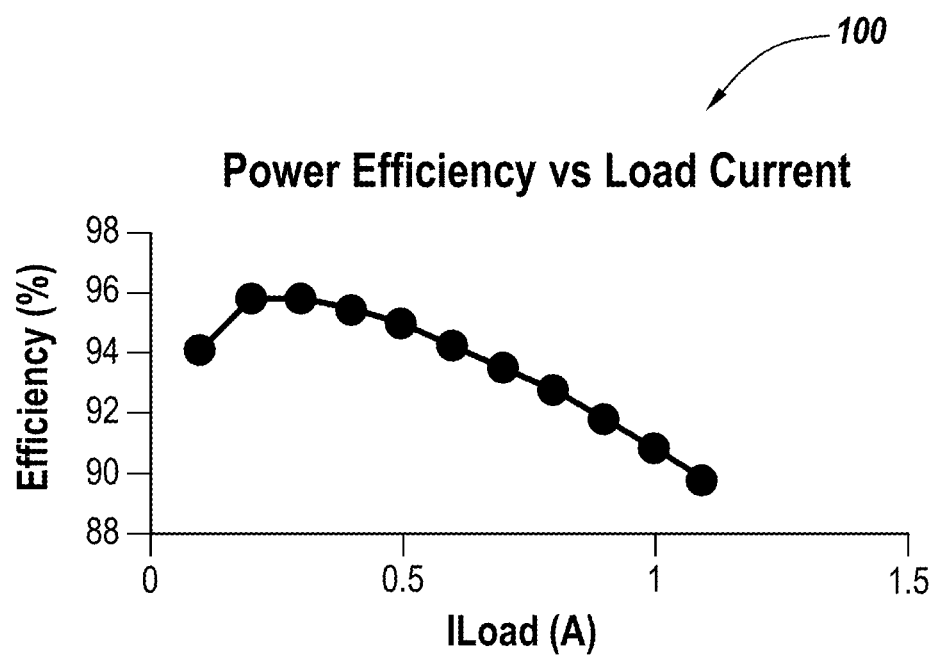
FIG. 5 is a graphical representation of the power efficiency curve of the power converters of FIG. 1 according to the teachings of the present invention.

According to the current embodiment, the illustrated power converters 12a-12n have an operating power load range of about 0 W to about 15 W, and the power converters are configured to reach near peak operating power efficiency of about 97% at about 2.6 W of rated load power. As shown in FIG. 5, each of the power converters 12a-12n has an associated power efficiency profile relative to the load current across the converters that are turned ON and which corresponds to the power required by the load, which is graphically illustrated. As shown in the graph 100, each of the power converters are capable of attaining peak power efficiency when providing relatively low load currents to the load 26. The power converter can achieve peak power efficiency of about 97% at between about 0.25-0.30 amps current load, which is equivalent to about 2.6 W of rated load power. As is also shown, each of the power converters are capable of sustaining above 90% power efficiency across nearly the entire rated power range of the converter. As used herein, the term "optimal power efficiency range" is intended to mean a converter power efficiency and/or a system power efficiency of above about 90%, and preferably above about 95%. The foregoing range also contemplates operating each of the power converters 12a-12n such that the power across each converter is in the range of between about 2.0 W and about 6.0 W, and preferably between about 2.5 W and about 5.0 W. The power levels can be easily correlated to load current levels as set forth in the graphs of FIGS. 5, 8 and 10 according to known electrical conversion techniques. One of ordinary skill in the art will readily recognize that the power converters can be operated outside of their optimal power efficiency range depending upon the specific type of power converter that is employed in the array 20. When operating as such, the power converters sacrifice efficiency for density (e.g., more wattage per cubic centimeter), and hence more power per power converter.

Figure 6:
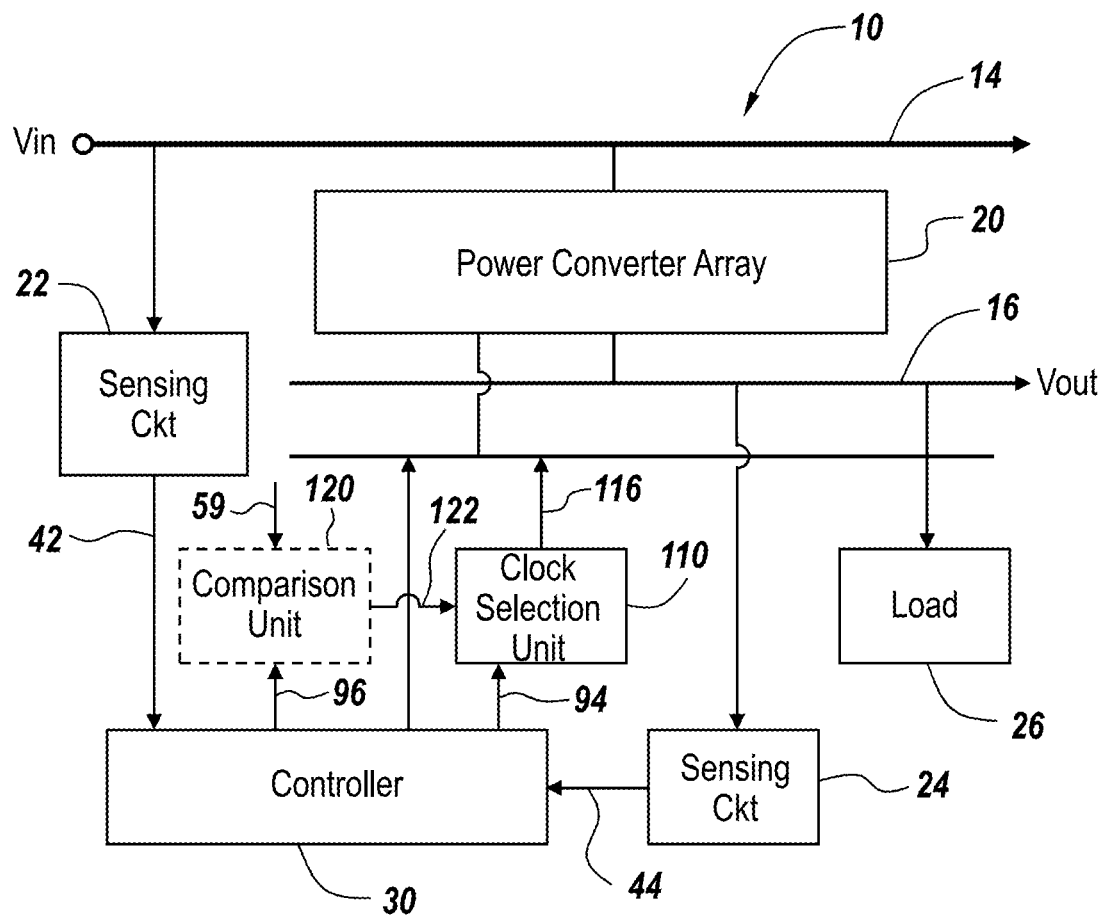
FIG. 6 is a second embodiment of the power conversion system of the present invention employing an optional comparison unit and an optional selection unit.
Figure 7:
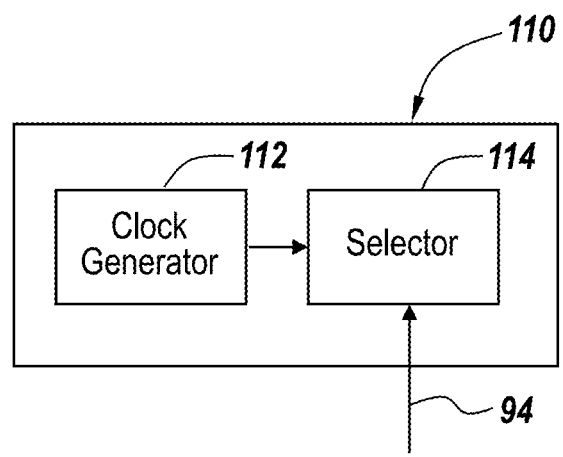
FIG. 7 is a schematic block diagram of the selection unit of FIG. 6 according to the teachings of the present invention.

The power conversion system 10 of the present invention can also include a clock selection unit 110 and an optional comparison unit 120, as shown in FIGS. 6 and 7. Like reference numerals refer to like components throughout the various views unless otherwise indicated. The clock selection unit 110 receives the output signal 94 generated by the controller 30 and is configured to select one or more parameters of the power conversion system, such as for example the operating frequency of one or more of the power converters 12a-12n within the power converter array 20. The clock selection unit 110 allows the system or user to select or optimize the number of power converters 12a-12n that are operating at selected frequencies. According to one practice, the clock selection unit 110 can be configured to select the operating clock rate frequencies of one or more of the power converters 12a-12n by selecting an initial or first clock rate frequency that ENABLES or turns ON the power converter and a second lower clock rate frequency that DISABLES or turns OFF the power converter. As such, the controller 30 through the clock selection unit 110 can turn ON and OFF selected power converters 12a-12n during use. Based on the size of the initial load 26, the controller 30 determines the appropriate number of power converters to operate that are capable of handling the power requirements of the load 26 based on the information stored in the LUT 92 while concomitantly operating the power converters 12a-12n within the optimal power efficiency range. The processor 70 of the controller 30 determines the number of power converters to be turned ON or ENABLED by accessing the LUT 92. As shown in FIG. 7, the clock selection unit 110 can include a clock generator 112 and a selector 114. The clock generator 112 generates a clock frequency signal that is transmitted to the selector 114. The selector 114 also receives the output signal 94 from the controller 30. The illustrated clock generator 112 can be located within the clock selection unit or can be located at other location within the system, such as in the power converter array 20. The clock selection unit can employ a single clock generator for generating a first or higher clock frequency (e.g., 200 kHz) which can be reduced by the clock selection unit if desired to a second lower frequency (e.g., 100 kHz). Alternatively, the clock generator 112 can include multiple clock generators for generating separate clock signals at different frequencies (e.g., 100 kHz and 200 kHz). According to one embodiment, the clock selection unit 110 along with the controller 30 can set the clock rate frequencies of one or more power converters to an ENABLE or ON clock rate frequency and the remaining portion of the power converters to a second lower DISABLE or OFF clock rate frequency (e.g., off or stand by mode). Those of ordinary skill in the art will readily recognize that the clock rate frequencies can be set to any selected range of frequencies depending upon the type of power converters employed in the system and the arrangement of the power conversion system 10, as well as the size of the load 26. According to one embodiment, the clock rate frequency can be in the range between about 0 kHz and about 250 kHz. More specifically, the ON clock rate frequency can be either about 100 kHz or about 200 kHz and the OFF clock rate frequency can be about 50 kHz. The OFF clock rate frequency also ensures that although the power converters are turned OFF, the capacitors 36a-36c within the power converters 12a-12n are still charged. Further, the ON clock rate frequency is sufficient to effectively achieve optimal or maximum efficiency of the power converters for a given load 26. The selection unit 110 can employ any suitable electronic circuits to assist in the receipt of output signals from the controller 30 and to perform the appropriate frequency selection, and can include one or more of multiplexers, comparators, FPGAs, and the like. The operational characteristics of these components is well known in the art.

Figure 8:
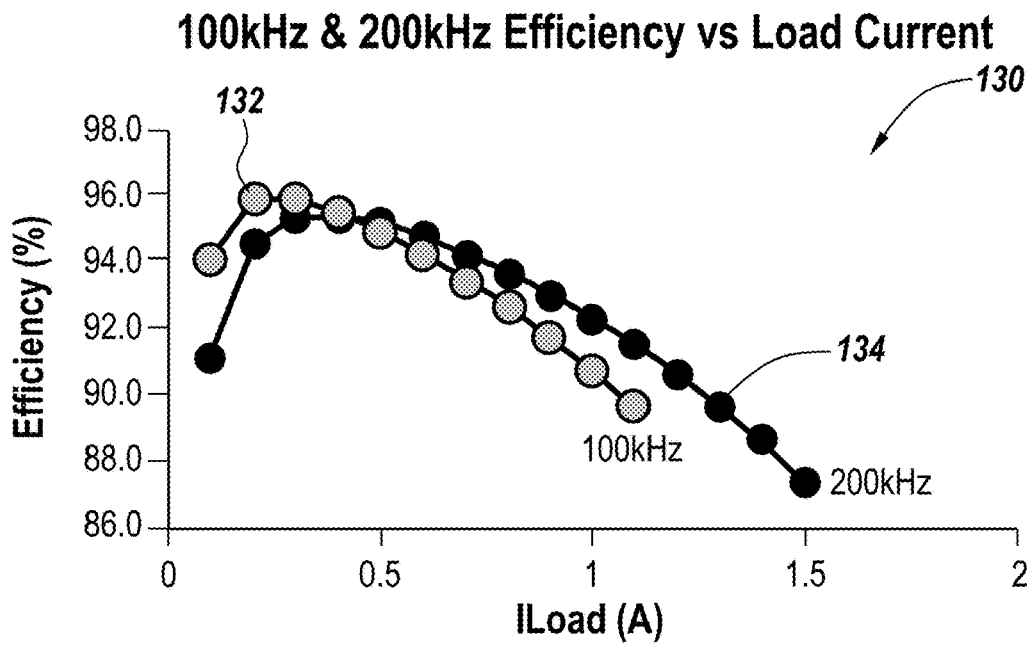
FIG. 8 is a graphical representation of the power efficiency curve of the power converters of FIG. 1 operating at different frequencies according to the teachings of the present invention.

FIG. 8 sets forth an example of two exemplary clock rate frequencies that are suitable for turning ON the power converters 12a-12n. The graph 130 illustrates the power efficiency curves of the power converters relative to the load current across each operating power converter as required by the load 26 for clock rate frequencies of 100 kHz and 200 kHz. The graph 132 for the 100 kHz frequency illustrates that the power converters operating on this frequency achieve relatively peak or optimal power efficiency at lower required load currents. The graph 134 for the frequency of 200 kHz shows that the power converters reach peak or optimal power efficiency at larger required load currents but maintain higher power efficiency rates over a broader range of load currents. As such, depending upon the type of power converters employed in the system and the size of the load 26, the power conversion system 10 can select either or both the 100 kHz frequency or the 200 kHz frequency, both of which serve to turn ON the power converters. According to one operational example, the selection unit 110 can select the 100 kHz frequency for the power converters when the load current is between about 0.0 A and about 0.5 A per power converter, and then switch to the higher 200 kHz frequency for load currents between about 0.5 A and about 1.5 A per power converter. In this example, the controller 30 controls or operates the power converters at the lower 100 kHz frequency until all of the power converters are turned ON and running up to about 0.5 A required current load per power converter. When this occurs, the controller 30 through the selection unit 110 increases the frequency to 200 kHz on selected power converters as the load current per power converter rises above the 0.5 A level. As such, the controller 30 can dynamically change the operating frequency of the power converters as a function of the load 26, where the lower frequency is employed at relatively low loads and the higher frequency at higher loads, so as to operate the power converters within the optimal power efficiency range. The frequency ranges and preferences can be stored in the memory 72 of the system 10 or controller 30, and the controller 30 can implement the proper clock frequency based on the instructions stored therein.

The power conversion system 10 of the present invention can also employ an optional comparison unit 120 that functions as an instantaneous response or limited reserve (ILR) circuit for providing momentary and nearly instantaneous power to the load 26 if the power required by the load increases relatively quickly and in such a manner that the normal operating duty cycle of the controller would be too slow or delayed to adequately turn ON the power converters to supply power to the load 26. As shown, the comparison unit 120 receives the instantaneous power signal 59 from the controller 30 which provides information regarding the instantaneous current and voltage requirements of the load 26 as well as information associated with the input power. The comparison unit 120 also receives the output signal 96 from the controller 30 which functions as a power threshold signal for the comparison unit. The comparison unit 120 serves to compare the instantaneous power signal 59 with the threshold output signal 96, and when the value associated with the power signal 59 is greater than the value associated with the output signal 96, the system 10 by-passes the controller 30 and sends a signal via the selection unit 110 to the power converter array 20 to provide an instantaneous power supply from the power converter array 20 to the load 26. As shown in FIGS. 3 and 6, the instantaneous power signal 59 is generated prior to introduction to the processor 70 of the controller 30. As such, the signal 96 is time delayed by the various processing that occurs within the processor 70 and outside of the processor by, for example, the filter 80, power determination unit 84, hysteresis unit 88 and LUT 92. When the instantaneous power signal 59 is greater than the threshold power level as supplied by the output signal 96 and as determined by the controller 30, the power conversion system 10 requires that additional power be supplied by the power converter array 20 to the load 26. However, in certain circumstances, this power needs to be supplied to the load 26 in a time period that is faster than the controller 30 can provide instructions to the power converter array 20 to provide the necessary power to the load by turning on additional power converters. As such, the comparison unit 120 by-passes the controller 30 and generates an output signal 122 that is transmitted to the selection unit 110, which in turn transmits an output signal 116 to the power converter array 120. When the output signal 116 is received by the power converter array 20, the power converters that are in the OFF state provide the stored or reserve energy from the internal capacitors 36a-36c directly to the load 26. The rapid response energy provided by the power converter array provides temporary additional power to the load 26 while the controller 30 processes the input information from the system 10 to determine the appropriate number of power converters to switch to the ON state to provide a sustainable and more durable source of power to the load 26 to meet the current load power requirements. According to one practice, the controller 30 can switch all of the power converters 12a-12n in the array 20 into the ON state to provide power to the load 26 and then determine the appropriate number of power converters to switch to the OFF state based on real time load power requirements. The comparison unit 120 can employ any suitable type of electronic components to effectuate the comparison operation, and can include for example a comparator, a multiplier and the like, and can be implemented using analog or digital components or a combination of both.

The power conversion system 10 of the present invention is scalable to high power and voltage levels (e.g., >1 kW). The power conversion array 20 converts the input power with relatively high power efficiency (at or above 97%) at relatively low power levels. The power conversion system 10 also employs a power converter array 20 that provides high power density due to the elimination of inductive devices, including bulky and inefficient transformers.

In operation, the input power is supplied to the power line 14 from a suitable power source (not shown) and hence to the converter array 20 and the power converters 12a-12n forming the array. The power converters are preferably DC-DC power converters that step down or reduce the voltage from an input level (e.g., 48V) to a suitable output level (e.g., 12V) at the output power line 16. The output power is supplied to a load 26. The input sensing circuit 22 measures, senses or detects the input voltage and current using well known detectors and the output sensing circuit measures, senses or detects the output voltage and current using well known detectors. The input and output power information generated by the sensing circuits 22, 24 are supplied to the controller 30.

As the power conversion system 10 moves from a no-load (0.0 W) state or condition and then starts increasing the power supplied to the load 26, the system begins with a power converter 12a initially turned ON or ENABLED. The first power converter 12a reaches peak or optimal efficiency of approximately 97% at about 2.6 W and maintains the power efficiency thereabouts until about 6.0 W. Hence, the optimal efficiency power range suitable for operating the power converters is between about 2.5 W and about 6.0 W across each power converter. Although the first or initial power converter 12a can handle power above 6.0 W, the power converter no longer operates in the optimal power efficiency range. When the power supplied by the power converter reaches a certain power level (e.g., about 5.0 W), the controller 30 turns ON or ENABLES a second power converter 12b to help share the power load and to provide power to the load 26. The power conversion system 10 turns on the appropriate number of power converters 12a-12n such that each power converter is operating within the optimal power range, and hence is operating at peak or near peak efficiency.

Figure 9:
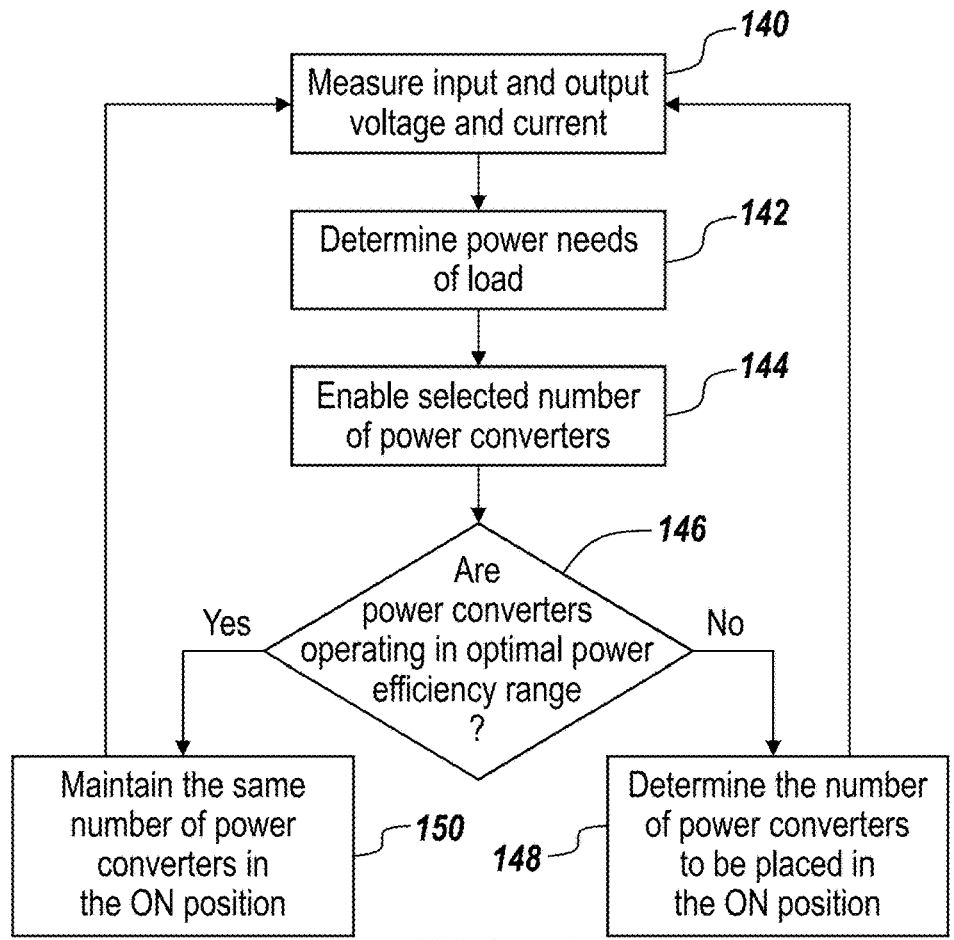
FIG. 9 is a schematic flow chart illustrating the steps involved when operating the power conversion systems of FIGS. 1 and 6 according to the teachings of the present invention.

FIG. 9 is a schematic flow chart diagram illustrating at least a portion of the method of the present invention. The power conversion system 10 employs the input sensing circuit 22 and the output sensing circuit 24 to sense the input and output voltage and current (e.g., power), step 140. The current and voltage information is supplied to the controller 30. The controller 30 then monitors and determines the power needs of the load 26 via the output current and voltage sensed by the output sensing circuit 24, step 142. The controller then ENABLES or turns ON one or more of the power converters 12a-12n of the power converter array 20, step 144, so as to supply the necessary power to the load 26. The controller 30 also determines the frequency of operation of the power converters via the controller 30 and the selection unit 110, FIG. 6. The controller 30 then determines whether the power converters 12a-12n are operating within the optimal power efficiency range by monitoring the power across each of the power converters, step 146. If the power converters are not operating in the optimal power efficiency range, then the controller controls the number of power converters that are operating, step 148. For example, if the power is above the optimal power efficiency range, then the controller turns ON a selected number of additional power converters. If the power across is each converter is below the optimal power efficiency range, then the controller turns OFF a selected number of power converters. If the power converters are operating within the optimal power efficiency range, then the controller 30 maintains the number of power converters that are operating, step 150. The illustrated process can be continued one power converter at a time up until the maximum number of converters in the array 20 are deployed. Using the adaptive dynamic efficiency optimization (ADEO) methodology of the present invention, all of the power converters starting with the second converter are operating in the optimal power efficiency range. This approach eliminates the traditional efficiency curve for power converters and allows the power conversion system 10 to operate at or very close to peak efficiency at any point in the rated load range above 2.6 W, which is equal to about 0.26% of rated load in a 1 kW design.

Figure 10:
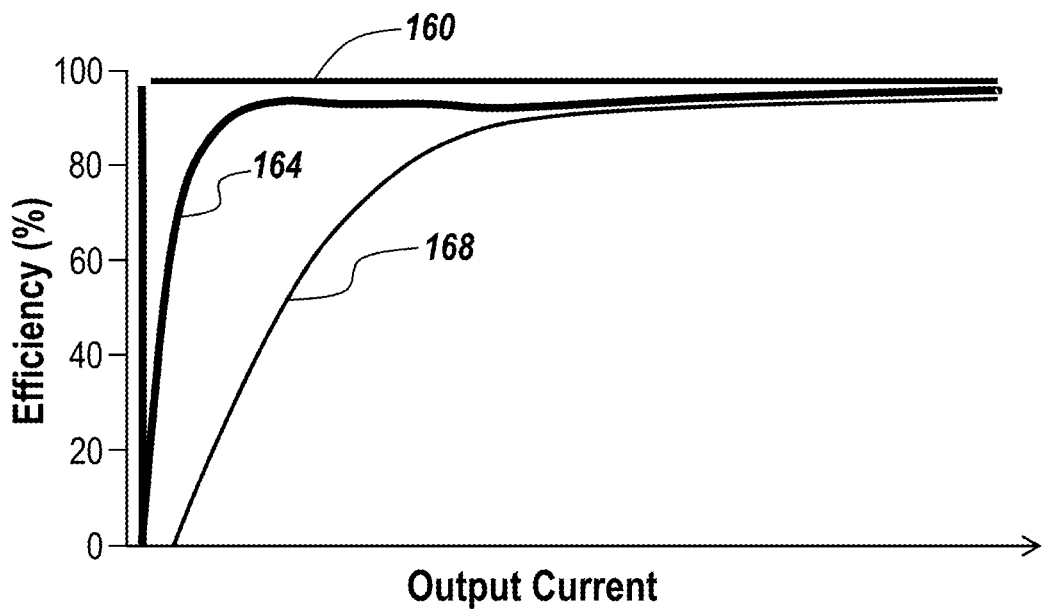
FIG. 10 is a graphical representation of the power efficiency curve of the power converters of FIG. 1 employing the adaptive dynamic efficiency optimization (ADEO) technique with the system not employing the ADEO and a conventional magnetic type power converter according to the teachings of the present invention.

As shown in FIG. 10, the power efficiency curve of the system 10 of the present invention is compared with that of a conventional magnetic or inductive based power converter system as well as to the system 10 if the power converters are operated without the adaptive dynamic efficiency optimization control of the present invention. The power efficiency curve 160 of the present invention when operating under the adaptive dynamic efficiency optimization method as implemented and controlled by the controller 30 is capable of reaching near or at peak operating efficiency of about 97% at less than about 1% of rated power load. When the power converters 12a-12n are switched OFF and ON by the controller 30 so as to maintain them in their respective optimal power efficiency range, the power efficiency curve 160 is maintained in the optimal power efficiency range. In contrast, the power efficiency curve 164 of the system 10 when operated without ADEO shows that the system 10 does not reach the peak efficiency level of the system 10 with the ADEO control, and reaches a peak power efficiency level at higher load current levels. The power efficiency curve 168 representative of a power conversion system employing magnetic type power converters without the ADEO of the present invention also shows that the system reaches peak efficiency at levels lower than the other systems and at higher load currents.

Figure 11:
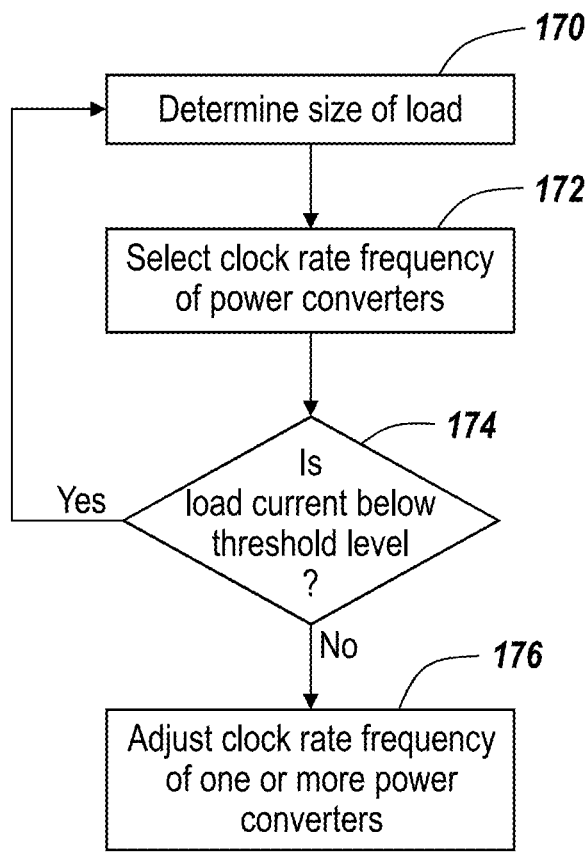
FIG. 11 is a schematic flow chart illustrating the steps involved when changing the frequency of operation of one or more of the power converters of the power conversion systems of FIGS. 1 and 6 according to the teachings of the present invention.

Optionally, the power conversion system 10 of the present invention can also select or vary the operating frequency of each of the power converters during use. As shown in FIG. 11, the system 10 initial determines the size of the load by monitoring the power requirements of the load 26 with the output sensing circuit 24, step 170. The controller 30 can determine the power requirements of the power converter array 20 by referencing the power table stored in the LUT 92. The controller can select the appropriate clock rate frequencies to operate the power converters based on pre-stored instructions, step 172. The system can then monitor the current required by the load to ascertain the power requirements thereof, and based on this information, the controller can determine if the load current is below a selected threshold level (e.g., 0.5 A), step 174. If the load current is below the threshold level, then the system can maintain the current frequency (e.g., 100 kHz) of the power converters 12a-12n. If the load current is above the threshold level, then the controller 30 can adjust or change the frequency level (e.g., 200 kHz) of the power converters, step 176.

Figure 12:
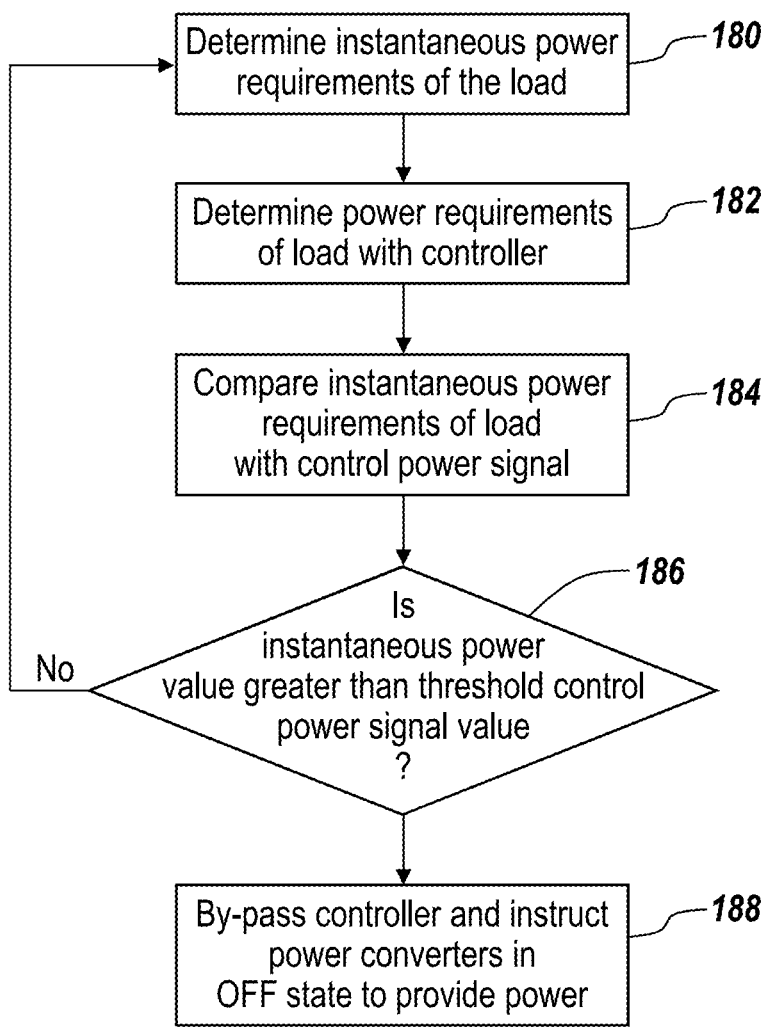
FIG. 12 is a schematic flow chart illustrating the steps involved when employing the instantaneous limited reserve (ILR) feature of the power conversion systems of FIGS. 1 and 6 according to the teachings of the present invention.

The instantaneous limited reserve (ILR) feature of the power conversion system 10 of the present invention is shown for example in FIGS. 6 and 12. The system 10 via the input and output sensing circuitry 22 and 24 and the controller 30 determines the instantaneous power at the input and the output power lines 14, 16, step 180. The controller 30 then determines the power requirements of the load, step 182, and sends control signals to the power converter array to supply power to the load. The comparison unit 120 can then compares the instantaneous power signal 59 and if desired any values associated therewith with the power control signal 96 generated by the controller 30, step 184. The power control signal 96 operates as a threshold value for the comparison unit 120. The comparison unit 120 then determines whether the instantaneous power value of the signal 59 is greater than the threshold value 96, step 186. If the instantaneous power value is not greater than the threshold value, then the system continues to monitor and determine the instantaneous power values. If, on the other hand, the instantaneous power value 59 is greater than the threshold value 96, then the comparison unit 120 generates an output signal 122 that is transmitted to the selection unit 110, which in turn by-passes the controller 30 and sends a signal to the power converter array 20 instructing the power converters in the OFF state or mode to discharge any stored power to the output power line 16, step 188. This instantaneous power is provided to the load 126 and provides an initial power boost while the controller 30 determines the appropriate number of power converters 12a-12n to turn to the ON state.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A system for controlling a plurality of power converters in a power system for supplying power to a load, comprising
   a plurality of switched capacitor type power converters forming an array for converting power between a first power level and a second power level when operating, wherein the plurality of switched capacitor type power converters are arranged in parallel relative to each other and wherein each of the switched capacitor type power converters has a plurality of capacitors for storing power,
   a common input power line directly coupled to an input of each of the plurality of switched capacitor type power converters on an input side for providing input power at the first power level,
   a common output power line directly coupled to an output of each of the plurality of switched capacitor type power converters on an output side for providing output power to the load at the second power level,
   a controller directly coupled to the outputs of the plurality of switched capacitor type power converters for controlling a power output of the plurality of switched capacitor type power converters,
   an input sensing circuit coupled to the common input power line and to the controller for sensing the input power on the common input power line and transmitting an input power signal to the controller, and
   an output sensing circuit coupled to the common output power line and to the controller for sensing the output power on the common output power line and transmitting an output power signal to the controller,
   wherein the controller is configured to control each of the plurality of switched capacitor type power converters so as to selectively turn one or more of the plurality of switched capacitor type power converters between
   an ON state at a first clock frequency so as to supply power to the load and
   an OFF state at a second lower clock frequency where the power converter does not transmit power to the load and remains operative so as to charge the plurality of capacitors associated therewith,
   wherein the plurality of switched capacitor type power converters are controlled as a function of the sensed input power and the sensed output power such that one or more of the plurality of switched capacitor type power converters in the ON state are operating in an optimal power efficiency range.

2. The system of claim 1, wherein each of the plurality of switched capacitor type power converters comprises a switched capacitor type DC-DC step-down power converter for converting the power from the first power level to the second power level, where the second power level is lower than the first power level.

3. The system of claim 1, wherein each of the plurality of switched capacitor type power converters comprises a DC-DC power converter, a DC-AC power converter, or a AC-DC power converter.

4. The system of claim 1, wherein the plurality of capacitors are electrically connected in a parallel arrangement, a serial arrangement, a parallel-serial arrangement, or a series-parallel arrangement.

5. The system of claim 1, wherein the controller comprises a processor, a look up table, and a memory for storing instructions that when received by the processor, instructs the processor to: determine the power across one or more of the plurality of switched capacitor type power converters, and based on the power of the one or more power converters, accessing the look up table and determining therefrom which of the plurality of switched capacitor type power converters the controller places in the ON state and the OFF state.

6. The system of claim 1, wherein the controller comprises
   a memory unit for storing instructions for controlling the plurality of switched capacitor type power converters,
   a signal conditioner for conditioning the input power signal and the output power signal and generating a conditioned output power signal representative of the instantaneous input power and output power,
   an AC-DC converter for converting the conditioned output power signal to a DC conditioned output power signal, and
   a processor for processing the DC conditioned output power signal and for generating based on the stored instructions controller output signals for controlling one or more of the plurality of switched capacitor type power converters so as to turn the plurality of switched capacitor type power converters into the ON state and the OFF state, wherein the input power signal has an input voltage component and an input current component and the output power signal has an output voltage component and an output current component, and wherein the signal conditioner further includes
   a voltage conditioning unit for buffering the input voltage component and the output voltage component to remove noise therefrom and to scale the input voltage component and the output voltage component to a selected voltage level for use by the controller, and
   a current conditioning unit for filtering the input current component and the output current component.

7. The system of claim 6, wherein the conditioned output power signal has a conditioned output voltage component and a conditioned output current component, and wherein the processor comprises
   a filter unit for averaging the conditioned output voltage component and the conditioned output current component of the conditioned output power signal,
   a power determination unit for determining the power across one or more of the plurality of switched capacitor type power converters based on an average of the conditioned output voltage component and the conditioned output current component and generating a power determination output signal,
   a hysteresis unit for reducing noise in the power determination output signal and for passing the power determination output signal to a look-up table only when the power changes by more than a hysteresis amount, and
   the look-up table is configured for storing information associated with a plurality of power levels across at least one of the plurality of switched capacitor type power converters correlated to a plurality of switched capacitor type power converters to be placed in the ON state or the OFF state, wherein the information in the look-up table includes the number of the power converters of the plurality of switched capacitor type power converters to be placed in the ON state based on a plurality of different power levels associated with the load while operating the plurality of switched capacitor type power converters in the ON state in the optimal power efficiency range.

8. The system of claim 7, wherein the controller generates one or more output control signals for turning a selected one or more of the plurality of switched capacitor type power converters into the ON state and the OFF state based on the power requirements of the load as correlated to the plurality of switched capacitor type power converters and associated power levels in the look-up table, and based on operating the plurality of switched capacitor type power converters in the ON state in the optimal efficiency range.

9. The system of claim 8, wherein the power levels across at least one of the plurality of switched capacitor type power converters correspond to the power requirements of the load.

10. The system of claim 7, further comprising
a clock selection unit coupled to the controller and to the plurality of switched capacitor type power converters for varying a frequency of one or more of the plurality of switched capacitor type power converters between the first clock frequency for placing the power converter in the ON state and the second clock frequency for placing the power converter in the OFF state, and
a comparison unit coupled to the controller and to the clock selection unit for receiving the conditioned output power signal and the power determination output signal generated by the power determination unit.

11. The system of claim 10, wherein the power determination output signal functions as a first output control signal and wherein the conditioned output power signal includes information related to the input power and to the output power, and wherein the comparison unit receives the conditioned output power signal and the first output control signal which functions as a power threshold signal, and in response generates an output comparison signal when a value associated with the conditioned output power signal is greater than a threshold value associated with the power threshold signal,
wherein when the conditioned output power signal of the signal conditioner has a value greater than the threshold value of the power threshold signal, which is indicative of additional power being required by the power converters, the output comparison signal generated by the comparison unit by-passes the controller and is transmitted to the clock selection unit, which in response transmits an output signal directly to the plurality of switched capacitor type power converters, and
wherein in response to the output comparison signal from the clock selection unit the stored power in the plurality of capacitors of the plurality of switched capacitor type power converters in the OFF state is transmitted directly to the common output power line so as to provide power to the load.

12. The system of claim 10, wherein the clock selection unit comprises one or more clock generators for generating the frequency and a selector for selecting the frequency.

13. The system of claim 6, wherein the current conditioning unit comprises a low pass filter for filtering the input and output current components.

14. The system of claim 1, wherein the first clock frequency for placing the power converter in the ON state is 100 kHz or 200 kHz and the second clock frequency for placing the power converter in the OFF state is 50 kHz.

15. A method of controlling a plurality of power converters in a power system for supplying power to a load, comprising
providing a plurality of switched capacitor type power converters forming an array for converting power between a first power level and a second power level, wherein the plurality of switched capacitor type power converters are arranged in parallel relative to each other and wherein each of the switched capacitor type power converters has a plurality of capacitors for storing power,
providing a common input power line directly coupled to an input of each of the plurality of switched capacitor type power converters on an input side for providing input power at the first power level,
providing a common output power line directly coupled to an output of each of the plurality of switched capacitor type power converters on an output side for providing output power to the load at the second power level,
providing a controller directly coupled to the output of each of the plurality of switched capacitor type power converters for controlling a power output of the plurality of switched capacitor type power converters,
sensing with an input sensing circuit coupled to the controller and to the common input power line input power on the common input power line and transmitting an input power signal to the controller, and
sensing with an output sensing circuit coupled to the controller and to the common output power line output power on the common output power line and transmitting an output power signal to the controller, and
controlling each of the plurality of switched capacitor type power converters so as to selectively turn one or more of the plurality of switched capacitor type power converters between
an ON state at a first clock frequency so as to supply power to the load and
an OFF state at a second lower clock frequency where the power converter does not transmit power to the load and remains operative so as to charge the plurality of capacitors associated therewith, wherein the plurality of switched capacitor type power converters are controlled as a function of the sensed input power and the sensed output power such that one or more of the plurality of switched capacitor type power converters in the ON state are operating in an optimal power efficiency range.

16. The method of claim 15, wherein each of the plurality of switched capacitor type power converters comprises a switched capacitor type DC-DC step-down power converter for converting the power from the first power level to the second power level, where the second power level is lower than the first power level.

17. The method of claim 15, further comprising determining power across one or more of the plurality of switched capacitor type power converters, and based on the power of the one or more of the plurality of switched capacitor type power converters, accessing a look up table and determining therefrom which one of the plurality of switched capacitor type power converters the controller places in the ON state and the OFF state.

18. The method of claim 15, wherein the controller comprises
a memory unit for storing instructions for controlling the plurality of switched capacitor type power converters,
a signal conditioner for conditioning the input power signal and the output power signal and generating a conditioned output power signal representative of the instantaneous input power and output power,
an AC-DC converter for converting the conditioned output power signal to a DC conditioned output power signal, and
a processor for processing the DC conditioned output power signal and for generating based on the stored instructions controller output signals for controlling one or more of the plurality of switched capacitor type power converters so as to turn the plurality of switched capacitor type power converters into the ON state and the OFF state, wherein the input power signal has an input voltage component and an input current component and the output power signal has an output voltage component and an output current component, and wherein the signal conditioner further includes a voltage conditioning unit for buffering the input voltage component and the output voltage component to remove noise therefrom and to scale the input voltage component and the output voltage component to a selected voltage level for use by the controller, and a current conditioning unit for filtering the input current component and the output current component.

19. The method of claim 18, wherein the conditioned output power signal has a conditioned output voltage component and a conditioned output current component, and wherein the processor comprises a filter unit for averaging the conditioned output voltage component and the conditioned output current component of the conditioned output power signal, a power determination unit for determining the power across one or more of the plurality of switched capacitor type power converters based on an average of the conditioned output voltage component and the conditioned output current component and generating a power determination output signal, a hysteresis unit for reducing noise in the power determination output signal and for passing the power determination output signal to a look-up table only when the power changes by more than a hysteresis amount, and the look-up table is configured for storing information associated with a plurality of power levels across at least one of the plurality of switched capacitor type power converters correlated to a plurality of switched capacitor type power converters to be placed in the ON state or the OFF state, wherein the information in the look-up table includes the number of the power converters of the plurality of switched capacitor type power converters to be placed in the ON state based on a plurality of different power levels associated with the load while operating the plurality of switched capacitor type power converters in the ON state in the optimal power efficiency range.

20. The method of claim 19, wherein the controller generates one or more output control signals for turning a selected one or more of the plurality of switched capacitor type power converters into the ON state and the OFF state based on the power requirements of the load as correlated to the plurality of switched capacitor type power converters and associated power levels in the look-up table, and based on operating the plurality of switched capacitor type power converters in the ON state in the optimal efficiency range.

21. The method of claim 15, further comprising conditioning the input power signal and the output power signal and generating a conditioned output power signal, and wherein the conditioned output power signal includes information related to the input power and to the output power varying a frequency of one or more of the plurality of switched capacitor type power converters between the first clock frequency for placing the power converter in the ON state and the second clock frequency for placing the power converter in the OFF state, and comparing a value associated with a control signal generated by the controller with a value associated with the conditioned output power signal which functions as a power threshold signal, and when the value of the conditioned output signal is greater than the value of the control signal, generating a comparison signal when a value associated with the conditioned output power signal is greater than a value associated with the power threshold signal.

22. The method of claim 21, wherein when the power threshold value of the conditioned output power signal of the signal conditioner is greater than the value associated with the controller output signal generated by the controller, which is indicative of additional power being required by the power converters, further comprising in response thereto by-passing the controller and passing the power threshold signal to the clock selection unit, and then in response transmitting stored power in the plurality of capacitors of the plurality of switched capacitor type power converters in the OFF state to the common output power line.

23. The method of claim 15, wherein the controller generates a first output control signal, further comprising conditioning with a signal conditioner the input power signal and the output power signal and generating a conditioned output power signal, varying with a clock selection unit the frequency of one or more of the plurality of switched capacitor type power converters, comparing with a comparison unit the conditioned output power signal and the first output control signal, and in response generating an output comparison signal when a value associated with the conditioned output power signal is greater than a value associated with the first output control signal, transmitting the output comparison signal to the clock selection unit, which in turn transmits an output signal to the plurality of switched capacitor type power converters, and in response to the output signal from the clock selection unit, transmitting the stored power of the plurality of capacitors associated with each of the plurality of switched capacitor type power converters in the OFF state to the output power line.

24. The method of claim 23, wherein the clock selection unit comprises one or more clock generators for generating the frequency and a selector for selecting the frequency.

* * * * *